March 14, 1950 W. M. PHILLIPS, JR 2,500,861
MACHINE FOR TREATING ARTICLES IN BULK
Filed June 30, 1945 2 Sheets-Sheet 2

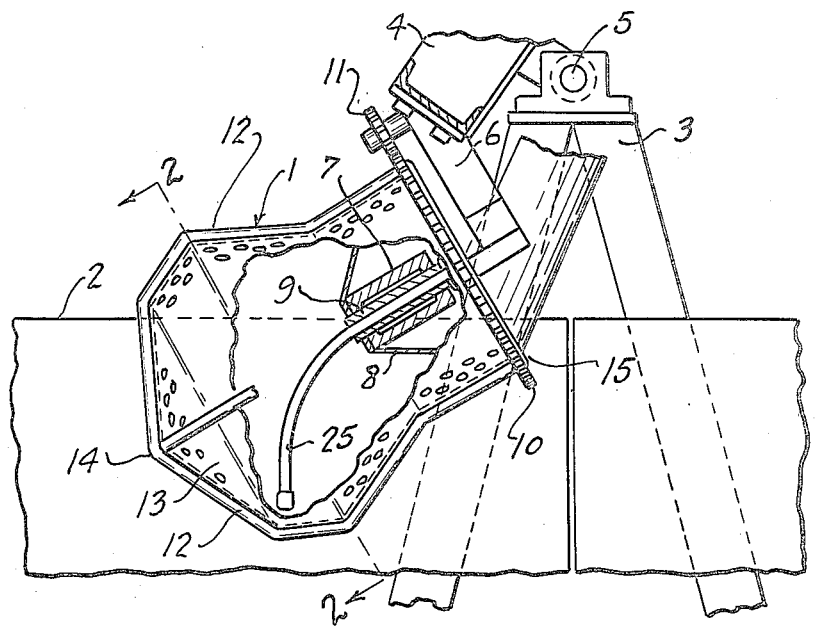
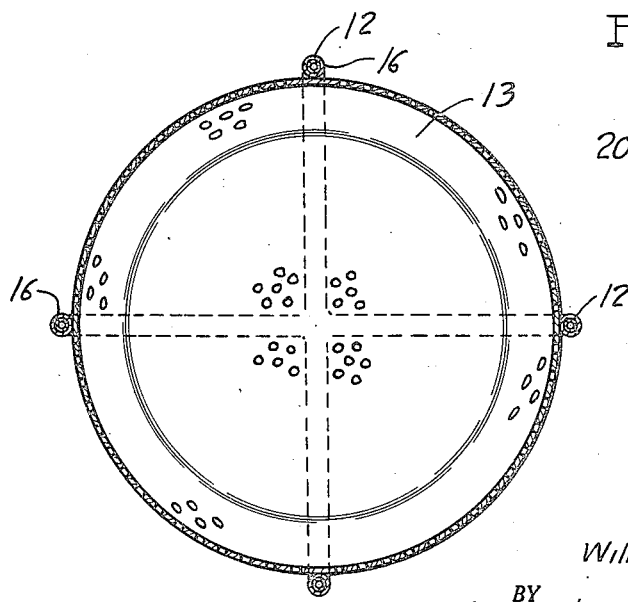
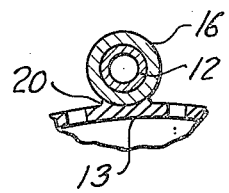
INVENTOR.
William M. Phillips Jr.

INVENTOR.
William M. Phillips Jr.
BY
Barnes, Kisselle, Laughlin & Raisch
Attorneys Patented Mar. 14, 1950

2,500,861

UNITED STATES PATENT OFFICE 2,500,861

MACHINE FOR TREATING ARTICLES IN BULK

William M. Phillips, Jr., Detroit, Mich., assignor to The Udylite Corporation, Detroit, Mich., a corporation of Delaware Application June 30, 1945, Serial No. 602,463

12 Claims. (Cl. 51—164)

This invention relates to a machine for treating articles in bulk, particularly small parts in bulk while subjecting the parts to treatments such as electrochemical cleaning, water rinsing, liquid chemical dips, electroplating, drying, chemical oxidation, chromatizing and phosphatizing. In particular the invention is directed to the barrel or container for holding the work during such treatment.

The conventional barrel used in electroplating is made from perforated sheet steel coated inside and out with hard rubber.

It is the object of this invention to produce a plating barrel which will operate more efficiently, wear longer, can be constructed more easily and cheaply, and which has many other advantages over barrels heretofore known and used.

My barrel comprises a rigid skeleton, preferably of rods, of any suitable material having the requisite strength, such as steel coated with electrical insulation or solid plastic material, in which is inserted a flexible perforated bag of insulating material preferably of rubber, either synthetic or natural, or similar thermoplastic material.

A few of the advantages which my barrel has over the conventional barrel will now be mentioned. In plating barrels it is common practice to make the perforated sheet steel anodic. When the inner coating wears through, the work will short circuit. In my barrel, even though the bag wears thin or completely through, the work will not short because the skeleton ribs are either insulated or made from electrically non-conducting material.

In the conventional barrel when the insulation wears through or breaks, repair is difficult, if not impossible. In my barrel when I fabricate the same from thermoplastic material, I can repair or replace the worn parts simply by welding a new piece of thermoplastic material in the area which has worn through.

In any plating barrel it is always desirable to obtain maximum porosity. I can obtain twenty-five percent (25%) area of perforation in my thermoplastic bag by drilling one-eighth inch diameter holes on three-eighths inch centers. To obtain the same porosity in a conventional barrel, the sheet steel will have to be perforated with three-eighths inch diameter holes on about nine-sixteenths inch centers because the insulating coating will reduce the diameter of the final hole to about one-eighth of an inch. Not only is the drilling of three-eighths inch holes on nine-sixteenths inch centers difficult, but providing satisfactory insulation in the holes to prevent short circuiting of the work is still more difficult. In my barrel thorough insulation of the perforations is assured because the perforated bag is made from an insulating material such as thermoplastic. In the conventional barrel only the insulating coating on the inside serves as a wear surface and since the inside coating comprises about one-half of the total coating material, the one-half of the coating on the outside of the barrel serves only as electrical insulation and is wasted insofar as wearing surface is concerned. In my barrel I utilize one hundred percent (100%) of the coating both for insulation and wearing surface.

A further advantage of my barrel is that it has a much greater resistance to abrasion and wear than the conventional barrel due to the fact that the bag is made of flexible thermoplastic material which is free to yield as the load tumbles during rotation of the barrel whereas in the conventional barrel the insulation is vulcanized or cemented to the perforated steel and therefore cannot yield and is subjected to considerable pounding.

In my barrel if any piece of work gets into or through the hole it may be pushed through the hole safely due to the elasticity or yieldability of the thermoplastic material from which the perforated bag is made whereas in a conventional barrel if a piece of work gets into a hole it cannot be pushed through and is very apt to cut or wear the insulation in the hole completely through, thereby short circuiting the work.

In my plating barrel the perforated bag or container, being flexible, cushions the load so that there is no danger of breakage while throwing in heavy loads. Further, the flexibility of the perforated bag permits the bag to conform to a shape that gives the best weight distribution for the load. In other words, since the perforated bag is flexible, it conforms or shapes itself about the load so that the load is distributed over a wide area whereas in the conventional barrel, due to the rigidity of the perforated steel, the load is concentrated over a much smaller area and in many instances portions of the load are carried upon a point contact with the barrel. This better weight distribution of the load in my barrel tends to prolong the life of the barrel.

In the drawings:

Fig. 1 is a vertical section showing my barrel in conjunction with an electroplating machine.

Fig. 2 is a section along the line 2—2 of Fig. 1.

Fig. 3 is a detail showing the insulation of the tubular rib.

Figure 4:
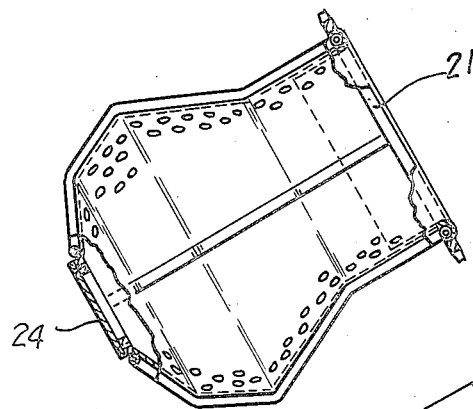
Fig. 4 is a perspective partly in section of my barrel.

For illustrative purposes, in Fig. 1 I have shown my barrel, generally designated 1, in use in an electroplating machine which comprises tank 2 for the electroplating solution, frame 3 tiltable support frame 4 pivoted as at 5, barrel support arms 6, bearing 7 fixed on arms 6, spider 8 secured to barrel 1 and bearing 9 which is journalled in bearing 7. For rotating barrel 1 a sprocket 10 is affixed thereto and driven by driving sprocket 11.

My barrel comprises an outer framework or skeleton of four preferably tubular ribs 12 and a flexible perforated bag 13 supported and confined within this skeleton. From the standpoint of practical operation I have found satisfactory a skeleton comprising four ribs 12 spaced apart ninety degrees about the axis of rotation of said barrel and welded or otherwise affixed together at the apex 14 of the barrel and joined to a ring 15 which forms the mouth or open end of my barrel. It is preferable to use as few ribs 12 as possible in order to create a minimum obstruction to current flow. However, the number of ribs 12 can be either increased or decreased, if desired, without departing from the spirit or scope of my invention. Ribs 12 are preferably tubular and made from steel or any other suitable material and insulated by means of insulating tubes 16 of electrically, non-conducting, flexible material of the same type as that from which bag 13 is made. Ring 15 also preferably is tubular and covered with an insulating coating 17 the same as ribs 12. Insulating coatings or tubes 16 are joined together at apex 14 to form a waterproof joint and insulating tubes 16 are also joined to insulation 17 about ring 15 to form a waterproof joint. Where insulation 16 and 17 is a thermoplastic material, this joint can be made by welding the insulation together at the joint in accordance with well-known thermoplastic welding methods. If insulation 16 and 17 is rubber, then a cemented joint can be used. Insulation 16 and 17 can be put on ribs 12 and ring 15 by dipping the same in a liquid insulating material of the type below described to form a homogeneous coating over the entire outer surfaces or ribs 12 and ring 15.

Ribs 2 and ring 15, if desired, can be made of either thermoplastic material, such as described below, or of a thermo-setting material such, for example, as a phenol-formaldehyde condensation product commonly known as Bakelite.

After fabricating the skeleton, as above described, I insert within skeleton 1 a preforated bag 13. Bag 13 should be made from flexible, electrically insulating material such as rubber or thermoplastic material. For purposes of illustration and not by way of limitation, bag 13 can be made from any of the following plastic materials: Buna S, synthetic rubber, a copolymer of butadiene and styrene; Buna N, a copolymer of butadiene and acrylonitrile; Neoprene, a polymer of chloroprene; butyl rubber, a copolymer of isobutylene and small amounts of unsaturated hydrocarbons such as butadiene or isoprene; Thiokols, synthetic rubbers comprising organic polysulfides; Koroseal, a plasticized vinyl chloride with tricresyl phosphate usually as a plasticizer; vinyl type thermoplastics consisting of copolymers of vinyl chloride and vinyl acetate; Saran, a copolymer of vinylidene chloride and vinyl chloride; and, of course, natural rubber which, when vulcanized, is flexible and elastic. It is understood that any flexible, water and acid resistant, electrically insulating material, preferably a thermoplastic material, can be utilized for making perforated bag 13 and insulating coatings 16 and 17.

Although bag 13 is flexible and preferably thermoplastic, obviously, under the operating temperatures to which it will be subjected, bag 13 should not become limp but should have sufficient strength or rigidity to maintain itself in opened position as a lining within skeleton 12. The thermoplastics above set forth all have melting points above the boiling temperature of water and therefore will be satisfactory even in hot plating baths. The type of thermoplastic that will be used for bag 13 will depend upon the temperatures and other operating conditions to which the bag will be subjected.

Where bag 13 is made from a thermoplastic material, it can be heated in hot water to make the same pliable and then partially collapsed to facilitate insertion of the bag through ring 15 and within skeleton 12 whereupon, preparatory to cooling, bag 13 can be expanded within skeleton 12 so as to conform to the inside shape of the skeleton. If skeleton 12 is made in the form of a cylinder, then, of course, bag 13 will be made in cylindrical form and inserted through ring 15 and the need for expanding the bag within the skeleton will not arise. Bag 13 preferably has merely a physical contact with skeleton 12 but, if desired, can be welded or cemented to insulation 16 on ribs 12, as indicated at 20 in Fig. 3.

Figure 5:
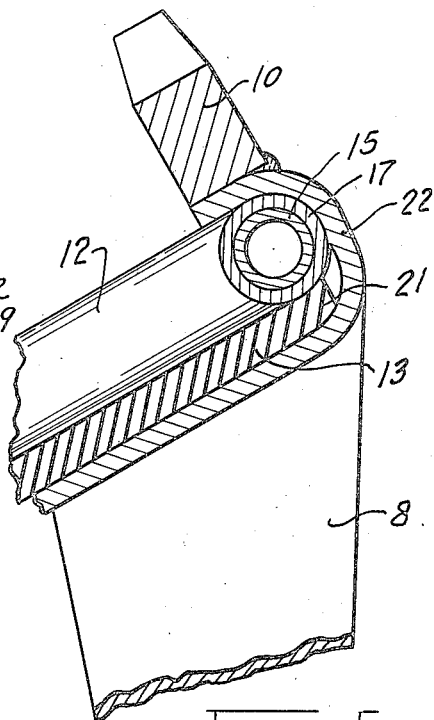
Fig. 5 is a sectional detail of my barrel.
Figure 6:
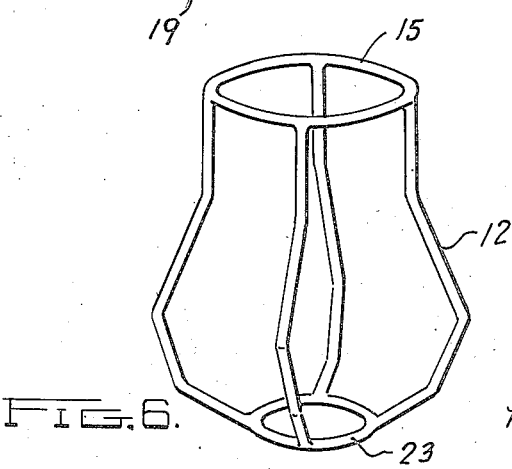
Fig. 6 is a perspective of the skeleton of my barrel.

In Figs. 4 and 5 I have illustrated one manner of securing the open end of bag 13 to the open end of skeleton 12. This is accomplished simply by clamping the open end or mouth 21 of bag 13 between the open end of skeleton 12 and ring 15 by means of a metal cylindrical ring 22 which is clamped over ring 15 and also serves as a support for sprocket 10.

The modification shown in Fig. 4 of my barrel differs only in that ribs 12 are connected at their lower ends to an insulated ring 23 in the same manner that the ribs are connected to ring 15. Ring 23 provides an opening covered by removable plate 24 of insulating material which can be removed to facilitate cleaning of the barrel.

When the machine is used for electroplating, electrical conductor 25 will be a cathode and the metal to be plated will be supplied from the solution in tank 2, and when used for anodizing, conductor 25 will be an anode.

As used herein, the term "plastic material" includes both synthetic and natural rubber.

Figure 7:
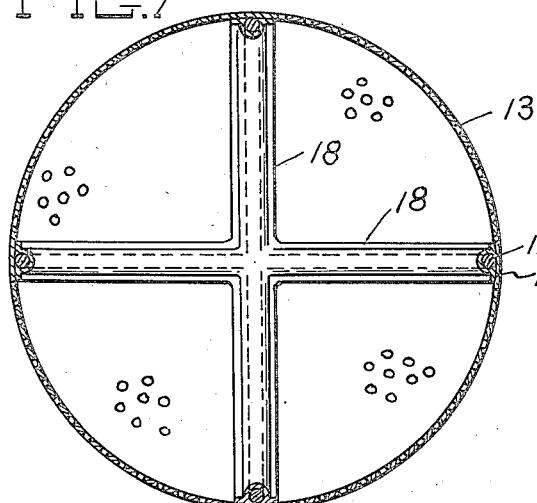
Fig. 7 shows a modification.

In the modified form of barrel shown in Fig. 7, the perforated bag 13 is positioned on the outside of the rigid framework 12 and frame 12 is covered by strips of insulating material 18 which are welded to the inside of the bag as at 19. Here again insulation 18 preferably comprises a flexible, electrically insulating material such as rubber or thermoplastic material.

I claim:

1. A rotary barrel for tumbling articles while treating articles in bulk comprising a substantially rigid skeleton having an open frame at one end and a flexible, self-sustaining perforated bag in open position within said skeleton with the mouth of the bag positioned at the open frame end of said skeleton, said bag being adapted to hold said articles while being treated, and means for rotating said barrel.

2. A rotary barrel for tumbling articles during electrochemically treating articles in bulk comprising a substantially rigid skeleton of a plurality of substantially rigid ribs positioned in spaced relation around the longitudinal axis of said barrel, said skeleton having an open frame at one end and a flexible, self-sustaining foraminated bag of electrical insulating plastic material within said skeleton, said bag being in open position with the open end of the bag positioned at the open frame end of said skeleton, said bag being adapted to hold said articles while being treated, and means for rotating said skeleton and bag as a unit.

3. A rotary barrel for tumbling articles while treating articles in bulk comprising a substantially rigid skeleton having an open frame at one end, an electrical insulating coating enveloping said skeleton and frame, and a foraminated, self-sustaining bag of thermoplastic material in open position within said skeleton with the open end of the bag positioned within the open frame end of said skeleton, means for securing the open end of said bag to said open frame, said bag being adapted to hold said articles while being treated, and means for rotating said barrel.

4. A rotary barrel for tumbling articles while treating articles in bulk constructed and arranged for rotation about its longitudinal axis and comprising a plurality of longitudinal metal ribs spaced circumferentially about said axis, an open metal frame concentric with the longitudinal axis of said barrel and fixed at one end of said ribs and the other end of said ribs converging inwardly toward the axis of rotation and rigidly secured together, a coating of electrically insulating material enveloping said ribs and frame, and a foraminated, self-sustaining thermoplastic bag within said skeleton, said bag being open with the open end of the bag positioned at the open frame end of said skeleton, said bag being adapted to hold said articles while being treated, and means for rotating said barrel.

5. A rotary barrel for tumbling articles while treating articles in bulk comprising a substantially rigid skeleton having an open frame at one end and a flexible perforated bag on the outside of said skeleton with the open end of the bag positioned at the open frame end of said skeleton, said bag being adapted to hold said articles while being treated, and means for rotating said barrel.

6. The combination as set forth in claim 5 including means for securing said skeleton to said bag.

7. A rotary barrel for tumbling articles while treating articles in bulk comprising a skeleton of substantially rigid ribs positioned around the longitudinal axis of said barrel and a flexible bag on the outside of said skeleton and adapted to hold said articles while being treated, said skeleton serving to hold said bag in open position, and means for rotating said barrel.

8. A rotary barrel for tumbling articles while treating articles in bulk comprising a metal skeleton of substantially rigid ribs positioned around the longitudinal axis of said barrel and a flexible bag on the outside of said skeleton and adapted to hold said articles while being treated, said skeleton serving to hold said bag in open position, and an electrically insulating coating over said skeleton and joined to said flexible bag, and means for rotating said barrel.

9. A rotary barrel for tumbling articles while treating articles in bulk comprising a flexible, plastic, self-sustaining perforated bag having one end open and adapted to hold said articles while being treated, a substantially rigid skeleton framework attached to said bag for supporting the bag and holding the same open, and a rotary support secured to said skeleton whereby said skeleton and bag can be rotated as a unit.

10. A rotary barrel for tumbling articles while treating articles in bulk comprising a self-sustaining, flexible plastic bag adapted to hold said articles while being tumbled, and a skeleton for holding said bag in open position, and means for rotating said skeleton and bag.

11. A rotary barrel for tumbling articles while being treated in bulk comprising a self-sustaining, flexible perforated bag of an electrically insulating plastic material adapted to hold said articles while being tumbled, said perforated bag having a closed bottom and open mouth, a substantially rigid skeleton framework attached to said bag for supporting the same and holding the bag open, the major portion of the area of said bag being located between the members of said skeleton whereby the major portion of the weight of said articles is supported directly by said perforated plastic material and indirectly by said skeleton, and a rotary support for said skeleton whereby said skeleton and bag can be rotated as a unit.

12. A rotary barrel for tumbling articles while being treated in bulk comprising a self-sustaining, flexible, perforated bag of an electrically insulating plastic material adapted to hold said articles while being tumbled, a skeleton framework attached to said bag for supporting the same and holding the same open, said skeleton comprising a plurality of longitudinal ribs positioned in spaced relation circumferentially about the axis of the barrel, said ribs converging toward the bottom of the barrel, and a ring secured to the upper ends of the ribs and substantially concentric with the longitudinal axis of the barrel, the mouth of the bag being connected to said ring whereby the ring holds the bag in open position with the skeleton, the major portion of the area of said bag being located between the members of said skeleton whereby the major portion of the weight of said articles is supported directly by said perforated plastic material and indirectly by said skeleton, and a rotary support for said barrel.

WILLIAM M. PHILLIPS, Jr.

REFERENCES CITED

The following references are of record in the file of this patent:

UNITED STATES PATENTS

| Number | Name | Date |
|---|---|---|
| 264,927 | Cassel | Sept. 26, 1882 |
| 2,072,170 | Herzog | Mar. 2, 1937 |
| 2,104,812 | Phillips | Jan. 11, 1938 |
| 2,187,079 | Hannon | Jan. 16, 1940 |
| 2,243,728 | Davis | May 27, 1941 |
| 2,290,036 | Davis | July 14, 1942 |

FOREIGN PATENTS

| Number | Country | Date |
|---|---|---|
| 110,248 | Great Britain | Oct. 18, 1917 |